United States Patent [19]
Bierer

[11] Patent Number: 5,950,954
[45] Date of Patent: Sep. 14, 1999

[54] LOW IMPEDANCE DEVICE AND METHOD OF WRAPPING STORED ELECTRIC CABLE TO MINIMIZE ITS ELECTRICAL IMPEDANCE

[76] Inventor: Walter S Bierer, 183 Elton Walker Rd., Blythewood, S.C. 29016

[21] Appl. No.: 09/076,431

[22] Filed: May 12, 1998

Related U.S. Application Data

[63] Continuation-in-part of application No. 08/859,697, May 21, 1997, abandoned.

[51] Int. Cl.$^6$ .............................. B65H 75/42; H02G 9/00
[52] U.S. Cl. .................................. 242/400.1; 242/388.91; 242/403; 191/12 R; 174/5 SG
[58] Field of Search .......................... 242/400.1, 388.9, 242/388.91, 403; 191/12 R; 174/5 R, 5 SG

[56] References Cited

U.S. PATENT DOCUMENTS

| | | |
|---|---|---|
| D. 344,884 | 3/1994 | Wilkerson . |
| 1,936,463 | 11/1933 | Strang ................................. 191/12 R |
| 1,940,702 | 12/1933 | Shope ................................. 242/388.91 |
| 2,160,961 | 6/1939 | Dorman ............................... 191/12 R |
| 3,619,773 | 11/1971 | Lathrop . |
| 3,837,590 | 9/1974 | Pollak . |
| 3,990,551 | 11/1976 | Jamison et al. . |
| 4,008,791 | 2/1977 | Shaffi-Kahany et al. . |
| 4,021,090 | 5/1977 | Frederickson . |
| 4,103,974 | 8/1978 | Nowacki et al. . |
| 4,321,643 | 3/1982 | Vernier . |
| 4,570,866 | 2/1986 | Drower ................................. 242/388.9 |
| 4,589,319 | 5/1986 | Litehizer, Jr. . |
| 4,796,830 | 1/1989 | Gelfman . |
| 4,880,182 | 11/1989 | Gelfman . |
| 4,901,195 | 2/1990 | Stemporzewski, Jr. . |
| 5,261,514 | 11/1993 | Evans . |
| 5,279,469 | 1/1994 | Foit . |
| 5,330,122 | 7/1994 | Wood . |
| 5,385,314 | 1/1995 | Hughes . |
| 5,419,508 | 5/1995 | Pierce . |
| 5,421,530 | 6/1995 | Bertagna et al. ................... 242/388.91 |

*Primary Examiner*—John M. Jillions
*Attorney, Agent, or Firm*—Michael A Mann; Nexsen Pruet Jacobs & Pollard LLP

[57] ABSTRACT

A device and method of wrapping an electric cable used for grounding a utility vehicle to minimize its electrical impedance to 60 Hz alternating current. Electrical cable is wrapped around an array of four spools that are arranged so as to form two parallel, closely-spaced planes with the axes of the spools defining the planes. The distance between the spools of each plane is larger than the distance between the planes so that the cable, when wound, forms long, parallel segments. By reversing the direction of the cable and keeping the segments parallel and close to each other, electrical currents induced in these segments cancel each other and keep the impedance in the wrapped cable minimal. Preferably the cable wrapping path begins between the two pairs of spools and continues counterclockwise outside both of the pairs of spools. The path then proceeds between the spool pairs and then clockwise outside of both pairs to the starting point.

19 Claims, 2 Drawing Sheets

U.S. Patent
Sep. 14, 1999
Sheet 1 of 2
5,950,954

LOW IMPEDANCE DEVICE AND METHOD OF WRAPPING STORED ELECTRIC CABLE TO MINIMIZE ITS ELECTRICAL IMPEDANCE

This is a continuation in part of 08/859,697, filed May 21, 1997, abandoned.

BACKGROUND OF THE INVENTION

1. Field of the Invention

The present invention relates to method for wrapping electrical cables for storage. In particular, the present invention relates to a device and method of wrapping an electrical cable to minimize the 60 Hz alternating current impedance of a stored electric cable.

2. Discussion of Background

Electric utility employees generally ground their vehicles when they are working in close proximity to an energized electric power line. Grounding is especially important for vehicles that have lift attachments, to lift workers and equipment above the ground to service power lines and transformers.

Vehicular grounding is accomplished using a heavy number 2 AWG gauge or larger copper cable stored on a reel on the back, side or front of the vehicle. One end of the cable is permanently attached to the frame of the vehicle; the other end has a heavy clamp that can be attached to a suitable earth ground, such as the closest utility pole ground, a temporary ground rod driven into the ground, or the system neutral. Because suitable earth grounds are not always close to the vehicle, the grounding cable is typically provided in lengths of about 70 feet or more. However, the length of the cable itself presents two safety problems.

The coiled cable is potentially a huge inductor. If a worker reels off only a portion of the cable, enough to reach the nearest earth ground, and part of the truck comes into contact with the line, the worker is in danger of exposure to electric shock from the voltage induced in the partially coiled cable. This voltage is as much as two or three times higher than what would occur if the cable were completely uncoiled from its storage reel and laid on the ground.

To minimize the impact of a partially coiled cable serving as an inductor, utility companies often require that the cable be completely uncoiled and placed on the ground. However, in the event a high level of fault current is passed through an unsecured cable lying on the ground, it can whip violently and injure workers from the physical impact.

Thus, although necessary to prevent even greater injury from an ungrounded vehicle, the grounding cable is itself a source of injury.

SUMMARY OF THE INVENTION

According to its major aspects and briefly recited, the present invention is a device and method of wrapping an electric cable to minimize its electrical impedance to 60 Hz alternating current.

An electrical conductor carrying an alternating current creates a time varying magnetic field. A single electrical conductor carrying an alternating current produces an expanding and collapsing magnetic field about the conductor; however, if a second conductor lays parallel to the first conductor and is carrying an equal alternating current that is 180° out of phase with the first conductor, the two magnetic fields will tend to cancel each other.

If a single electrical conductor is folded back on itself and laid in parallel, in essence, the two conductors carry an equal current in opposite directions and the surrounding magnetic fields will also tend to cancel each other. As a result, the electrical impedance of the folded wire will be substantially reduced.

According to the present method, electrical cable is wrapped around a structure that defines two, spaced-apart, parallel planes. Segments of the wrapped cable will lay in parallel to each other on the outsides and between the structure and in phase opposition to each other. The structure that defines these planes can be embodied in a variety of ways, such as a pair of plates where the cable bends around the edge of each plate or an array of four spools where each pair of spools defines one of the planes and each spool corresponds to the edge of a plate. For simplicity, the preferred embodiment will be described and illustrated using an array of four spools but it will be clear that plates or any other structures that can be used to change the direction of a cable so that it can be wrapped and stored according to the present method are equivalent to an array of four spools.

In particular, a first spool and a spaced-apart second spool define a first plane with the first and second spools at first and second ends of the first plane, respectively. Spaced apart from the first and second spools are a third spool and an opposing fourth spool, defining a second plane. The planes pass through the axes of the spools. To wrap the cable in accordance with the present method, the cable is positioned between first spool and third spool, then routed from the first spool to the second spool. Next, the cable is routed counterclockwise around the second spool, back to the first spool and around the third spool. Next, the cable is wrapped counterclockwise around the fourth spool toward the first spool. Finally, the cable is routed clockwise around the first spool toward the second spool and then around the fourth spool. Following the path for the wrap is more important than beginning at the same place, but starting the cable between the first and third spools is preferred.

A major advantage of the present invention is the increased overall safety while working on transmission lines. Since the cable is wrapped in a manner to lower impedance, workers have a much lower chance of exposure to electric shock by a partially coiled cable. Moreover, the cable will not have to be fully unwrapped to be used, thereby lowering the risk of injury by a cable whipping from a high level of fault current.

Another major advantage of the present invention is the reduction of impedance in the electrical cable. This feature arises from the method of wrapping cable that places the alternating current 180° out of phase as the cable is folded around the spools. The net result of opposing phases is cancellation of the magnetic fields of the segments.

An important feature of the present invention is the method of wrapping cable to produce phase opposition. By reversing the direction of the wrap, impedance in one segment of the wrap going in a first direction is canceled out by impedance in the next segment of the wrap.

Many other features and advantages of the present invention will be apparent to those skilled in the art of power cable use and storage from a careful reading of the Detailed Description of Preferred Embodiments accompanied by the following drawings.

DETAILED DESCRIPTION OF PREFERRED EMBODIMENTS

Figure 1:
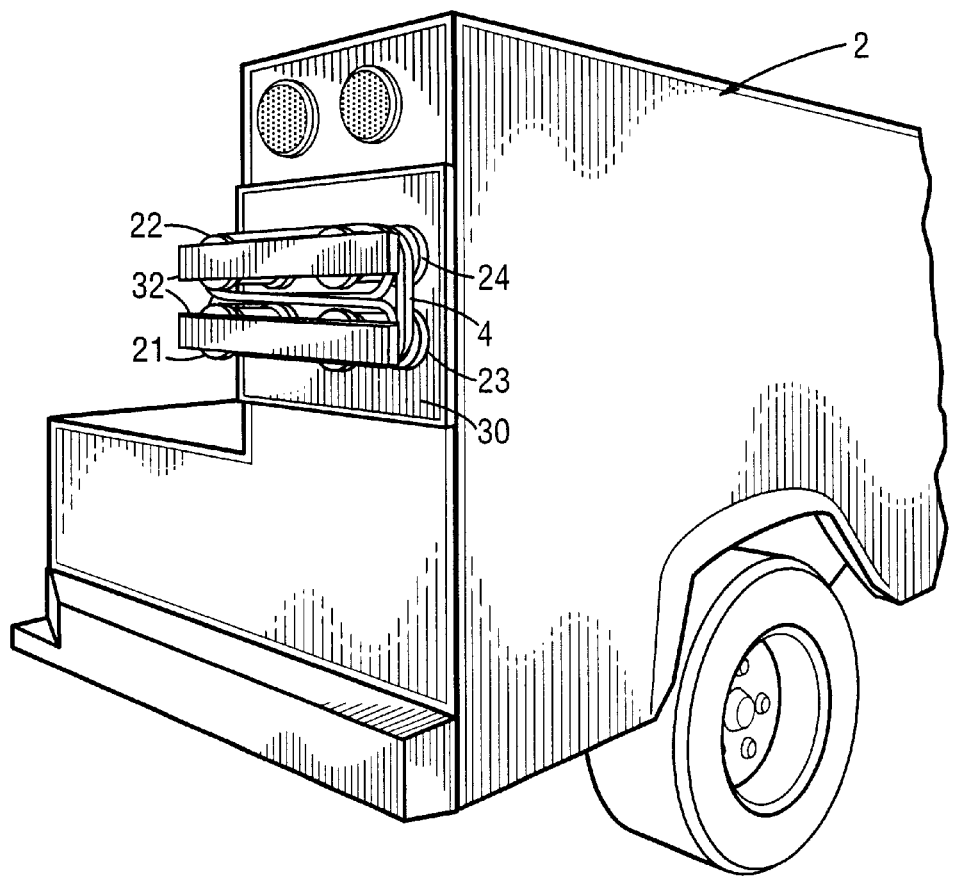
FIG. 1 is a partial perspective view of a utility vehicle with an electrical cable storage system installed thereon, according to a preferred embodiment of the present invention.
Figure 2:
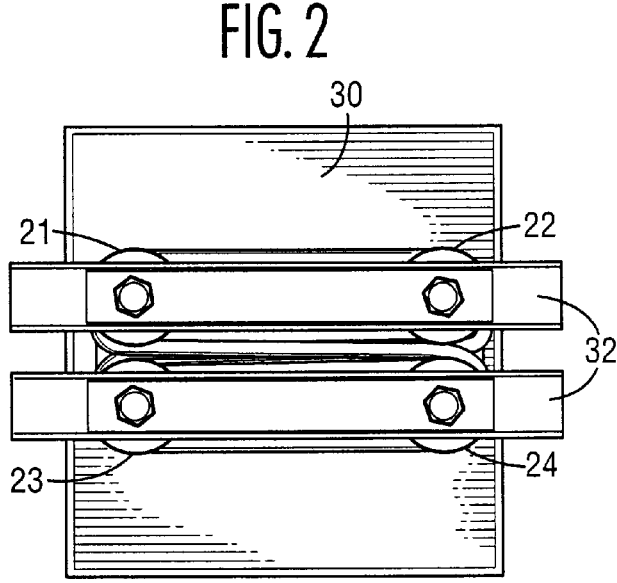
FIG. 2 is a front view of a cable storage system, according to a preferred embodiment of the present invention.
Figure 3:
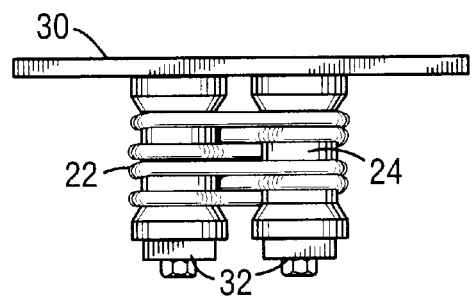
FIG. 3 is a top view of a cable storage system, according to a preferred embodiment of the present invention.

The present invention is a device and method of wrapping an electric cable to minimize its electrical impedance. The system is designed so that when a cable is wrapped onto the present cable-wrapping system in accordance with the present method, the impedance of the cable is reduced below that of other cable-wrapping systems and, indeed, below that of a cable stretched out on the ground.

Accordingly, the present method involves wrapping a cable along a path that has certain characteristics that include not only the route the cable is to take but the orientation of each segment of the cable with respect to other segments. In order to apply the present method, the present invention is also a device that facilitates that wrapping method and assures that the wrapped cable has the characteristics required by the present method.

The device requires a base or surface on which to mount structures that define two spaced-apart, parallel planes: a first plane and an opposing second plane. This structure may take several forms but is preferably four spools that, when viewed as two pair of spools define, by their axes, two spaced-apart parallel planes. These planes are closely spaced so that the bulk of the cabling wound onto the structure forms a series of segments parallel to each other and to the plane of the structure. The term segment means a portion of the cable running from one bend to the next. The planes are ideally as close as practical to still permit the cable to pass between them. They may be more or less a little farther apart to accommodate the bending radius of the cable. Each segment should be as long as practical to minimize the proportion of cable running around the spools and maximize the relative lengths of the segments. Also, for a single "wrap" which is the length of cable needed to follow the complete path one time, there should be six segments and ideally the device should be dimensioned to hold an integral number of wraps.

Thus the present invention comprises four spools attached to a base. The spools are positioned to define two, parallel, spaced apart planes. A first spool 21 and a second spool 22 define a first plane. The second plane is defined by a third spool 23 and a fourth spool 24. The four spools 21–24 preferably form the corners of a narrow rectangle, when viewed from above, where the long sides are first and second planes.

A "spool" in this specification may refer to a curved surface against which cabling may be placed and used to change its direction, or a hook onto which a loop of cable may be hung, or a pair of hooks about which a cable is wound. Preferably, spools are used so that there is greater control over the geometry of it and no damage to the cable when it is wound tightly over the spool. A retaining plate 32 may be attached to the tops of first spool 21 and second spool 22 and between third spool 23 and fourth spool 24 for rigidity. Preferably, retaining plate 32 is longer than the distance between first spool 21 and second spool 22 or third spool 23 and fourth spool 24 in order to create a flange to retain cable 4.

The size of spools 21–24 and distance between them may differ depending upon the length and gauge of cable 4; however, preferably the distance between first spool 21 and second spool 22 is much greater than the distance between first spool 21 and third spool 23 or second spool 22 and fourth spool 24. Also the distance between first spool 21 and third spool 23 or second spool 22 and fourth spool 24 is preferably just far enough so that the cable can pass between them. In other words, the distance between spools 21 and 22, and between spools 23 and 24 maximizes parallel lengths of opposite phase while minimizing the length of cable that will be perpendicular to these parallel segments. This determination, which is a function of the length and thickness of the cable and its stiffness, is within a person of ordinary skill in the art without having to engage in undue experimentation.

Figure 4A:
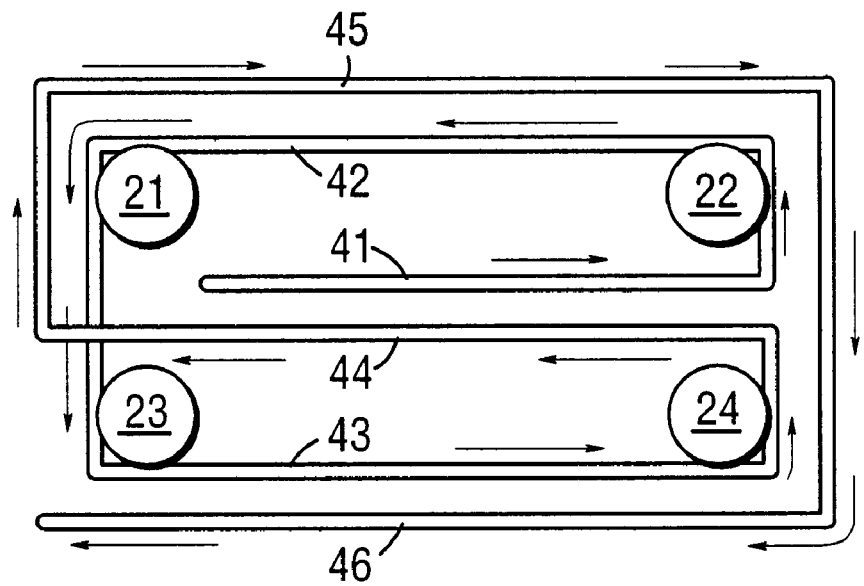
FIGS. 4A–4B illustrate the method for wrapping the cable, according to a preferred embodiment of the present invention.
Figure 4B:
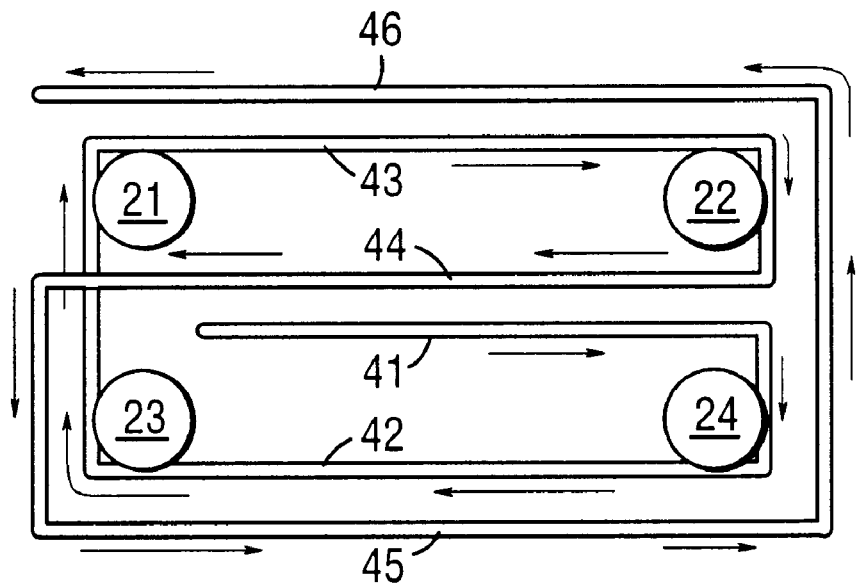

The method of wrapping the cables such that the cable segments lay in parallel and phase opposition to each other as shown in FIG. 4A. A segment is a length of cable extending between first spool 21 and second spool 22 or third spool 23 and fourth spool 24. During the wrapping process the portion between first spool 21 and second spool 22 and between third spool 23 and fourth spool 24 should not be transversed by cable 4. Assuming cable 4 is initially positioned between first spool 21 and third spool 22 (although the starting point could be anywhere along the cable path), cable 4 is routed from first spool 21 to second spool 22. This section of cable 4 between first spool 21 and second spool 22 is the first segment 41. Next, cable 4 is routed counterclockwise around second spool 22 back to first spool 21 to create a second segment 42. Cable 4 then runs from first spool 21 to third spool 23. Next, cable 4 is routed counterclockwise around third spool 23 to fourth spool 24 creating third segment 43. Cable is then routed counterclockwise around fourth spool 24 between to first spool 21 creating fourth segment 44. Next, cable 4 reverses direction to be routed clockwise around first spool 21 to second spool 22 making a fifth segment 45. The term "reverses direction" means more than a change in path direction as would occur when bending the cable around one of the spools, but a reversal in path from either clockwise to counterclockwise or counterclockwise to clockwise directions. Cable 4 is next routed clockwise around second spool 22 and clockwise around fourth spool 24 to third spool 23 creating a sixth segment 46. This completes one wrap around the path, six continuous segments of cable laying in three pairs, each pair containing two parallel segments where the phase of the currents oppose. As illustrated in FIG. 4, the six segments can be grouped into three substantially adjacent parallel pairs: fifth segment 45 and second segment 42; first segment 41 and fourth segment 44; and third segment 43 and sixth segment 46. An adjacent parallel pair is two spatially close segments that have little angle between them. It is clear that cable could be wrapped in the opposite direction while the cable segments would still lay in parallel and phase opposition to each other as illustrated in FIG. 4B.

To quantify the advantage of the present invention in minimizing impedance, a fifty-foot length of AWG 4/0 cable subjected to its maximum current, 30,000 amperes, would generate 4.35 volts/foot laying on the ground, 18.3 volts/foot coiled on a steel drum, and 8.03 volts/foot coiled on an aluminum drum. In contrast, the present method of wrapping cable would generate only 2.5 volts/foot.

If only ten feet of the cable is needed to reach the nearest ground, the present method of wrapping cable generates only 100 volts compared to 732 for the steel drum, for a significant reduction. A cable lying completely on the ground would still generate 174 volts.

It will be apparent to those skilled in power cable usage and storage from the foregoing detailed description that many changes and substitutions can be made to the preferred embodiments described without departing from the spirit and scope of the present invention, which is defined by the appended claims.

What is claimed is:

1. A method for wrapping electrical cable so that its impedance, when wrapped, is reduced, said method comprising the steps of:

bending electrical cable about a structure that defines two spaced-apart, planes so that the cable follows a predetermined path around and between said planes, said path characterized by one reversal of direction so that said cable is wrapped in a series of substantially parallel, adjacent segment pairs but said adjacent segment pairs run in opposing directions whereby electromagnetic fields induced in said substantially parallel adjacent segment pairs cancel; and repeating said bending step until said cable is completely wrapped.

2. The method as recited in claim 1, wherein said path includes at least three substantially parallel segment pairs.

3. The method as recited in claim 1, wherein said substantially parallel segment pairs are substantially parallel to each other.

4. The method as recited in claim 1, wherein the length of said substantially parallel segment pairs is significantly larger than the distance between said segment pairs so the amount of cable used as substantially parallel segments pairs is maximized.

5. The method as recited in claim 1, wherein said structure is dimensioned so that said repeating step is done an integral number of times for the length of said cable.

6. The method as recited in claim 1, wherein said pair of planes are substantially parallel to each other.

7. The method as recited in claim 1, wherein said pair of planes has a major dimension and a minor dimension, said major dimension being substantially larger than said minor dimension, said adjacent segment pairs substantially parallel to said major dimension of said pair of planes.

8. A device for storing electrical cable so that said cable, when stored has minimal impedance when exposed to an electromagnetic field, said device comprising:

a base; and a pair of spaced-apart structures carried by said base and that define two planes, said structures being spaced apart just enough for electrical cable to be wound therebetween so that, when electrical cable is wound onto said structures, segments of said cable lay parallel to each other and, by winding said cable between said structures, the direction said cable is wound initially can be reversed so that electrical current induced in said segments of said cable by external electromagnetic fields cancels itself.

9. The device as recited in claim 8, wherein said pair of structures are substantially parallel so that said segments of said cable when wound around said structures are substantially parallel to each other.

10. The device as recited in claim 8, wherein said structures are separated by just more than the thickness of said cable.

11. The device as recited in claim 8, wherein said structures are an array of four spools.

12. The device as recited in claim 8, wherein said structures are an array of four spools wherein the axes of said spools define two parallel planes.

13. A device for electrically grounding a vehicle, said device comprising:

a base;

a first pair of spaced-apart curved surfaces carried by said base;

a second pair of spaced apart curved surfaces carried by said base and aligned in parallel with said first pair of surfaces; and an electrical cable wrapped around said first and said second pair of surfaces, said cable wrapped in a series of substantially parallel, adjacent segment pairs that run in opposing directions whereby electromagnetic fields induced in said substantially parallel, adjacent segment pairs cancel.

14. The device as recited in claim 13, wherein the distance between said curved surfaces of said first pair of curved surfaces is greater than the distance between said first and said second pairs of curved surfaces.

15. The device as recited in claim 13, wherein said cable is wrapped around said first and said second pairs of curved surfaces in a series of at least three substantially parallel segment pairs.

16. The device as recited in claim 13, wherein said cable is wrapped around said first and said second pairs of curved surfaces in a series of substantially parallel segment pairs that are parallel to each other.

17. The device as recited in claim 13, wherein said first pair of curved surfaces are a first pair of spaced-apart spools and said second pair of curved surfaces are a second pair of spaced-apart spools.

18. The device as recited in claim 17, further comprising a first plate attached to the top of said first pair of spools and a second plate attached to the top of said second pair of spools.

19. The device as recited in claim 18, wherein said first and said second plates extend beyond said first and said second pairs of spools so as to form flanges.

* * * * *